United States Patent
Nakayama et al.

(10) Patent No.: US 11,261,584 B2
(45) Date of Patent: Mar. 1, 2022

(54) WORK MACHINE

(71) Applicant: Kubota Corporation, Osaka (JP)

(72) Inventors: Daisuke Nakayama, Sakai (JP); Hironobu Nogami, Sakai (JP); Norita Tottori, Sakai (JP); Naoya Okamoto, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/094,663

(22) Filed: Nov. 10, 2020

(65) Prior Publication Data
US 2021/0198870 A1 Jul. 1, 2021

(30) Foreign Application Priority Data
Dec. 26, 2019 (JP) .............................. JP2019-237397

(51) Int. Cl.
*E02F 9/22* (2006.01)
*F16H 37/04* (2006.01)
*B60K 17/28* (2006.01)

(52) U.S. Cl.
CPC ............ *E02F 9/2296* (2013.01); *B60K 17/28* (2013.01); *B60Y 2200/221* (2013.01); *F15B 2211/50518* (2013.01); *F16H 37/042* (2013.01)

(58) Field of Classification Search
CPC ................... E02F 9/2296; B60K 17/10; B60K 2024/0866; B60K 17/28
USPC ......................................................... 60/421
See application file for complete search history.

(56) References Cited

U.S. PATENT DOCUMENTS

| | | | |
|---|---|---|---|
| 5,823,825 A * | 10/1998 | Murphy | H01R 13/6585 439/607.5 |
| 6,199,380 B1 | 3/2001 | Ishii | |
| 2007/0151376 A1 | 7/2007 | Matsufuji | |
| 2008/0035102 A1 | 2/2008 | Matsufuji | |
| 2012/0247846 A1* | 10/2012 | Ichikawa | B60H 1/00378 180/65.21 |
| 2015/0246622 A1 | 9/2015 | Ichikawa | |
| 2016/0091078 A1* | 3/2016 | Fukunaga | B60K 17/28 74/11 |

FOREIGN PATENT DOCUMENTS

| | | |
|---|---|---|
| EP | 2505403 A2 | 10/2012 |
| JP | H6199140 A | 7/1994 |
| WO | 2005088150 A1 | 9/2005 |

* cited by examiner

*Primary Examiner* — Michael Leslie
*Assistant Examiner* — Daniel S Collins
(74) *Attorney, Agent, or Firm* — The Webb Law Firm (57) ABSTRACT

A work machine includes a transmission case (5) extending in the front-back direction of a machine body, a first hydraulic unit (V) provided on one of mutually opposite wall portions (5a, 5b) of the transmission case (5), a second hydraulic unit (44) provided on a second one of the wall portions (5a, 5b), and a supply passage (43) configured to supply operating oil from the first hydraulic unit (V) to the second hydraulic unit (44). The first hydraulic unit (V) and the second hydraulic unit (44) are aligned to be overlapped with each other as viewed in a direction orthogonal to a case axis (X) extending along the front-back direction of the transmission case (5). The supply passage (43) extends inside the transmission case (5) in a straight line orthogonal to the case axis (X).

8 Claims, 7 Drawing Sheets

WORK MACHINE

CROSS-REFERENCE TO RELATED APPLICATION

This application claims priority to Japanese Patent Application No. 2019-237397 filed Dec. 26, 2019, the disclosure of which is hereby incorporated by reference in its entirety.

BACKGROUND OF THE INVENTION

1. Field of the Invention

The present invention relates to a work machine including a transmission case, and a unit provided on an outer surface of the transmission case to be supplied with operating oil.

2. Description of the Related Art

A work machine is disclosed in JP H06-199140 A, for example.

In JP H06-199140 A, a tractor includes a casing of a continuously variable transmission device is connected to a transmission case; and an oil filter is provided on an outer wall of the casing. An oil passage is formed in the transmission case, etc. to supply operating oil stored in the transmission case as charge oil for the continuously variable transmission device.

Specifically, JP H06-199140 A discloses an oil passage configuration, wherein operating oil in a bottom portion of the transmission case is supplied to an internal oil passage inside a side wall of the transmission case, and the operating oil in the internal oil passage is supplied to an oil filter by pressurizing it with a charge pump, and then the operating oil is supplied from an oil passage inside the casing to a hydraulic circuit of the continuously variable transmission device.

Compared with an arrangement having a conduit outside a transmission case, the arrangement disclosed in JP H06-199140 A, which has an oil passage inside a side wall of a transmission case, can be formed with a smaller number of parts, whereby assembly of an oil passage system can be facilitated.

Taking a tractor as an example of the work machine, it may include a multi-disc clutch inside a transmission case to permit or block transmission of a travel driving force or a driving force for an output power take-off shaft (PTO shaft); and a valve unit attached to the outer surface of a wall portion of the transmission case to supply operating oil to the clutch.

Suppose an arrangement that includes an oil filter on one side wall of a transmission case, a valve unit on the other side wall of the transmission case, and a supply oil passage configured to supply operating oil from the valve unit to the oil filter. In the oil passage disclosed in JPH06-199140A, a hole-shaped oil passage is to be formed inside the transmission case (i.e. through a wall thereof). However, the transmission case will have a complicated structure, and there is room for improvement in transmission case production that requires time and trouble.

Under the above circumstances, there is need for a work machine that forms a reasonable oil passage to supply operating oil from one hydraulic unit to the other, with the two hydraulic units provided on opposite wall portions of the transmission case, respectively.

SUMMARY OF THE INVENTION

One aspect of the present invention is as below:
A work machine comprising:

a transmission case provided on a machine body and extending in a front-back direction of the machine body, the transmission case having mutually opposite wall portions;

a first hydraulic unit provided on one of the wall portions, and a second hydraulic unit provided on the other of the wall portions; and a supply passage configured to supply operating oil from the first hydraulic unit to the second hydraulic unit, wherein the first hydraulic unit and the second hydraulic unit are aligned to be overlapped with each other as viewed in a direction orthogonal to a case axis extending along a front-back direction of the transmission case, and the supply passage extends inside the transmission case in a straight line orthogonal to the case axis.

With the above characteristic arrangement, the supply passage is orthogonal to the case axis. This allows operating oil to be supplied from the first hydraulic unit to the second hydraulic unit over the shortest distance. Further, the supply passage is in a straight line. This reduces the passage resistance of the supply passage.

The above arrangement thereby provides a work machine that includes a transmission case and two hydraulic units on respective opposite wall portions of the transmission case and that has a reasonable oil passage configured to supply operating oil from one hydraulic unit to the other.

In one preferred embodiment:
the transmission case includes an internal member that is formed integral with respective inner surfaces of the wall portions, and
at least part of the supply passage is formed into a hole-shaped oil passage by cutting the internal member.

With the above arrangement, the internal member integral with inner portions of the transmission case may be, for instance, drilled for formation of a hole-shaped portion. This allows a hole-shaped oil passage to be formed as a portion of the supply passage.

In addition thereto, the supply passage may include the hole-shaped oil passage, and an in-pipe oil passage in form of a pipe-shaped member.

The above arrangement allows the supply passage to be formed from an in-pipe oil passage in the pipe-shaped member and a hole-shaped oil passage in the internal member. Further, the above arrangement uses a pipe-shaped member for a portion of the supply passage. If, for instance, there is a slight error between (i) the position of that port which serves to supply operating oil to the first hydraulic unit or the second hydraulic unit and (ii) the axis of the supply passage, slightly deforming the pipe-shaped member allows the pipe-shaped member to be connected easily.

In addition thereto, the hole-shaped oil passage may extend from either one of the one and the other of the wall portions, and the pipe-shaped member may extend from the other one of the one and the other of the wall portions to an end of the hole-shaped oil passage.

The above arrangement allows operating oil to be supplied from the first hydraulic unit or second hydraulic unit attached to one of the wall portions to the second hydraulic unit or first hydraulic unit attached to the other one of the wall portions through the pipe-shaped member and the hole-shaped oil passage.

In one preferred embodiment:
the transmission case houses a hydrostatic-type continuously variable transmission device,
a bottom portion of the transmission case serves as an operating oil tank configured to store the operating oil,
the first hydraulic unit includes a valve unit configured to control the operating oil from the operating oil tank, and the second hydraulic unit includes a filter configured to filter the operating oil to be supplied to the continuously variable transmission device.

With the above arrangement, the valve unit controls supply of operating oil from the operating oil tank to the supply passage, and the operating oil from the supply passage is filtered by the filter before being supplied to the continuously variable transmission device.

In one preferred embodiment:

a support section is provided above the supply passage for supporting a clutch shaft of a multi-disc clutch mechanism that is configured to hydraulically permit or block transmission of a driving force.

The above arrangement allows the supply passage to be present at a position other than the position of the support section supporting the clutch shaft of the clutch mechanism. The internal member (which is integral with the respective inner surfaces of the wall portions) may, for instance, include a support section supporting the clutch shaft. This eliminates the need to include such a support section as a separate member.

In one preferred embodiment:

the work machine further comprises: a front-wheel drive shaft is provided below the supply passage, the front-wheel drive shaft being configured to transmit a driving force from the transmission case to a front wheel.

The above arrangement allows the supply passage to be present at a position other than the position of the front-wheel drive shaft.

In one preferred embodiment:

at least one of the first hydraulic unit and the second hydraulic unit is attached to an outer surface of the wall portion associated therewith without a gap to the outer surface.

With the above arrangement, at least one of the first hydraulic unit and the second hydraulic unit is attached to a wall portion of the transmission case in such a manner as to be in close contact therewith. This not only allows stable attachment, but also prevents leakage of operating oil.

Other aspects of the invention and advantages expected therefrom will be apparent upon reading following detailed description.

DETAILED DESCRIPTION OF PREFERRED EMBODIMENTS

An embodiment of the invention will be described hereinafter with reference to the drawings.

[Overall Configuration]

Figure 1:
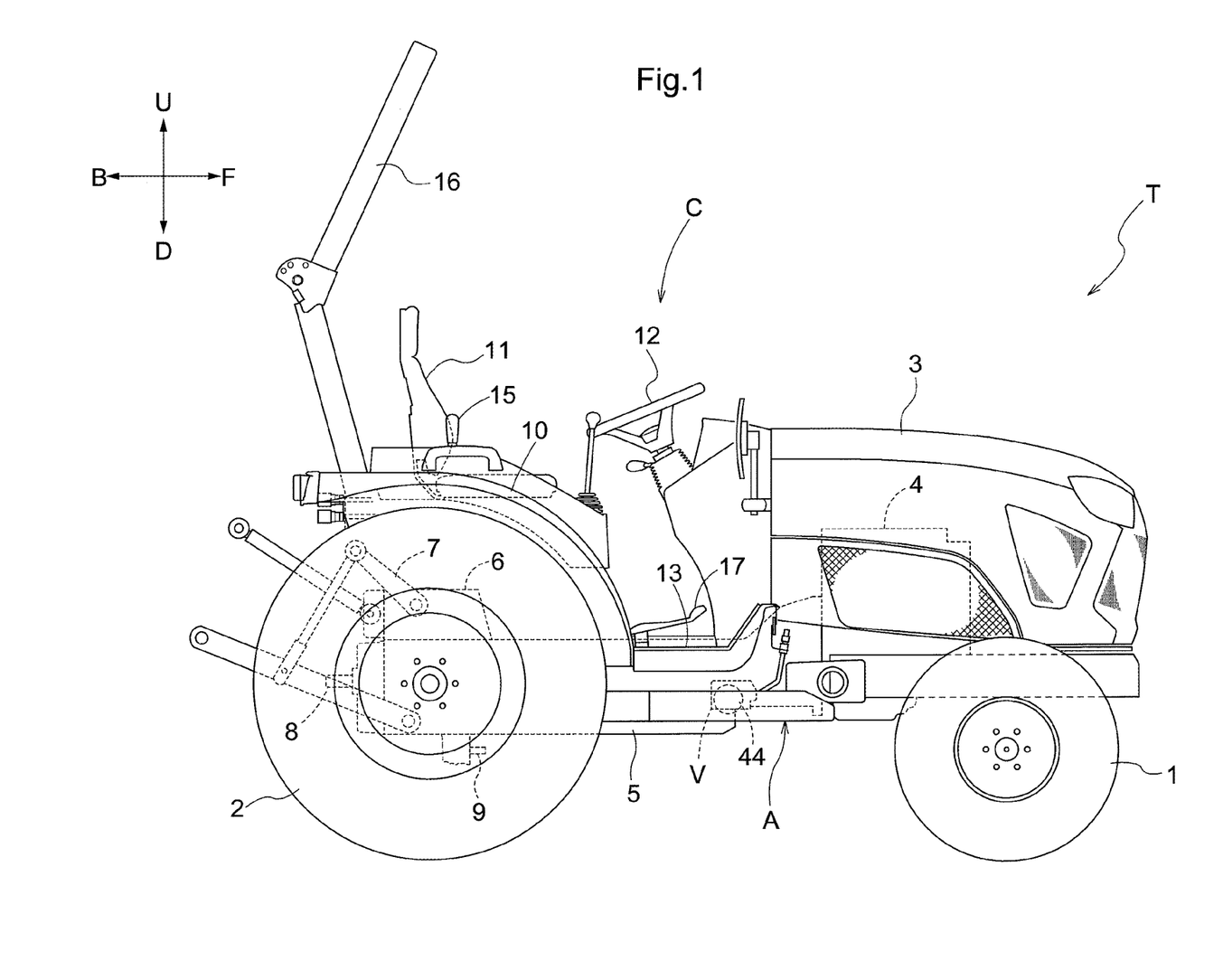
FIG. 1 is a side view of a tractor.
Figure 2:
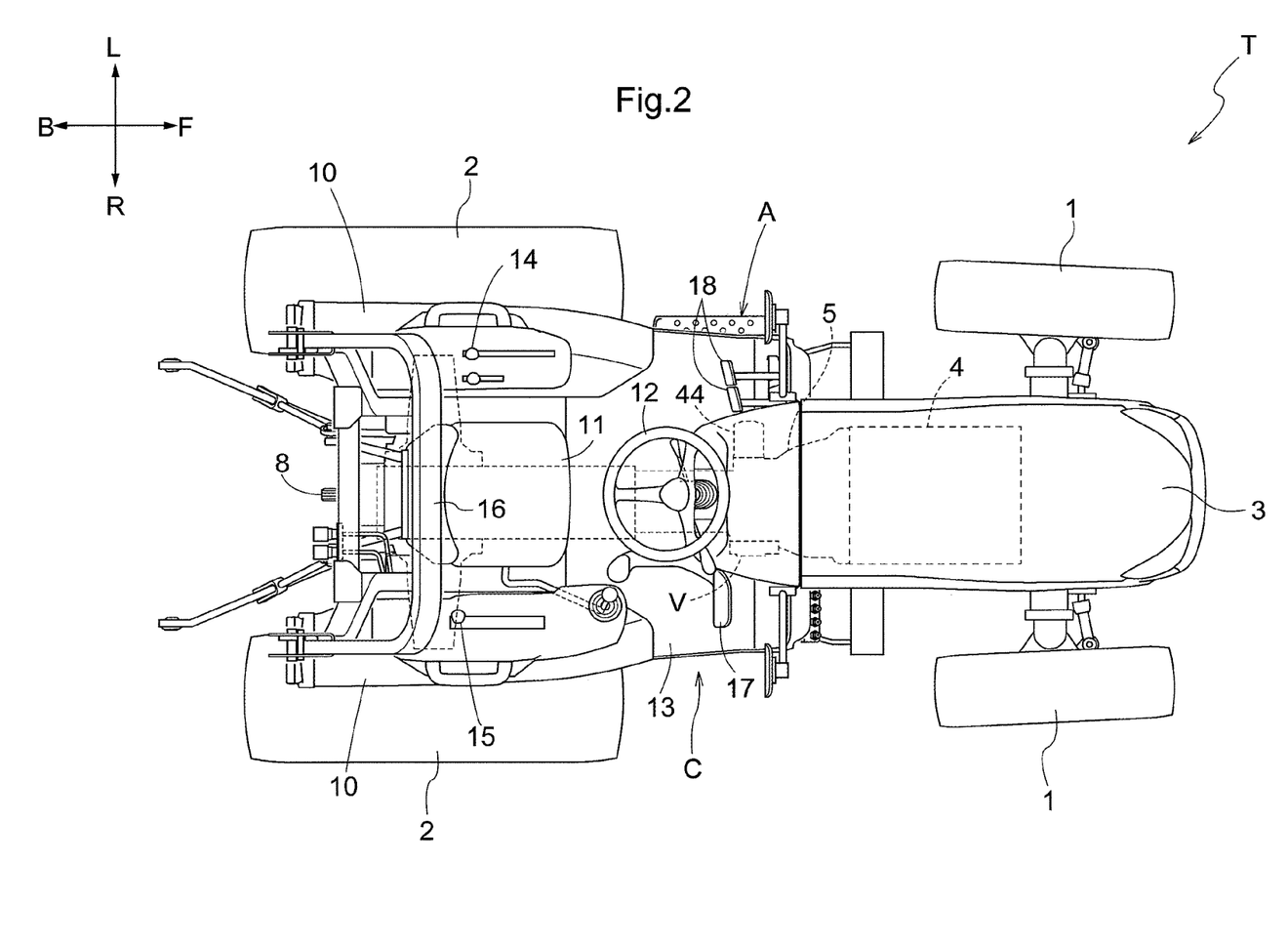
FIG. 2 is a plan view of the tractor.

As shown in FIGS. 1 and 2, a tractor T is illustrated as an exemplary work machine (work vehicle), including a machine body A provided with a pair of right and left front wheels 1 and a pair of right and left rear wheels 2; an engine 4 covered by an engine hood 3 at a forward portion of the machine body A; and a driver section C at a rear portion of the machine body A.

In following description, "F" shown in FIGS. 1 and 2 depicts to indicate the forward direction, "B" the backward direction, "U" the upward direction, "D" the downward direction, "R" the rightward direction, and "L" the leftward direction.

The tractor T further includes: a transmission case 5 in an area extending from a central portion of the machine body A to the back end thereof for varying the driving force of the engine 4; a lift cylinder 6 housed in the transmission case 5 at a rear upper portion thereof; and a pair of right and left lift arms 7 configured to be lifted and lowered in response to operation of the lift cylinder 6.

The tractor T still further includes: a rear power take-off (PTO) shaft 8 protruding backward from the back end of the transmission case 5 for transmitting a driving force to e.g. a rotary tiller work implement (not shown) that is supported by the lift arms 7 to be lifted and lowered. The tractor T further includes a mid PTO shaft 9 protruding forward from a lower face of the transmission case 5 for driving another work implement (not shown) to be provided under the machine body A.

The driver section C includes a driver's seat 11 between right and left rear-wheel fenders 10, a steering wheel 12 in front of the driver's seat 11, and a floor 13 under the driver's seat 11.

The driver section C further includes: an output power control lever 14 protruding upward from a lever guide on an upper face of the rear-wheel fender 10 on the left side of the driver's seat 11; a lifting/lowering control lever 15 protruding upward from a lever guide on an upper face of the rear-wheel fender 10 on the right of the driver's seat 11; and a roll-over protection structure (ROPS) frame 16 standing erect behind the driver's seat 11 and having an inverted U-letter shape.

The driver section C further includes an accelerator pedal 17 on the right side of the floor 13, and a brake pedal 18 on the left side of the floor 13 at a forward portion thereof.

The output power control lever 14 is configured to control a PTO clutch 32 (an example of the "friction clutch"; see FIG. 3) in the transmission case 5 to switch the PTO clutch 32 between an engaged state to permit a driving force to be transmitted to the rear PTO shaft 8, and a disengaged state to block transmission of the driving force. The lifting/lowering control lever 15 is configured to control supply/discharge of operating oil to the lift cylinder 6 to thereby control the lifting/lowering operation of the lift arms 7. Incidentally, the ROPS frame 16 includes pillar-shaped portions standing erect at right and left positions, respectively, behind the driver's seat 11 and having upper ends thereof connected with each other. The ROPS frame 16 is configured to protect the driver seated on the driver's seat 11 in the event of roll-over of the machine body A.

[Transmission Case]

Figure 3:
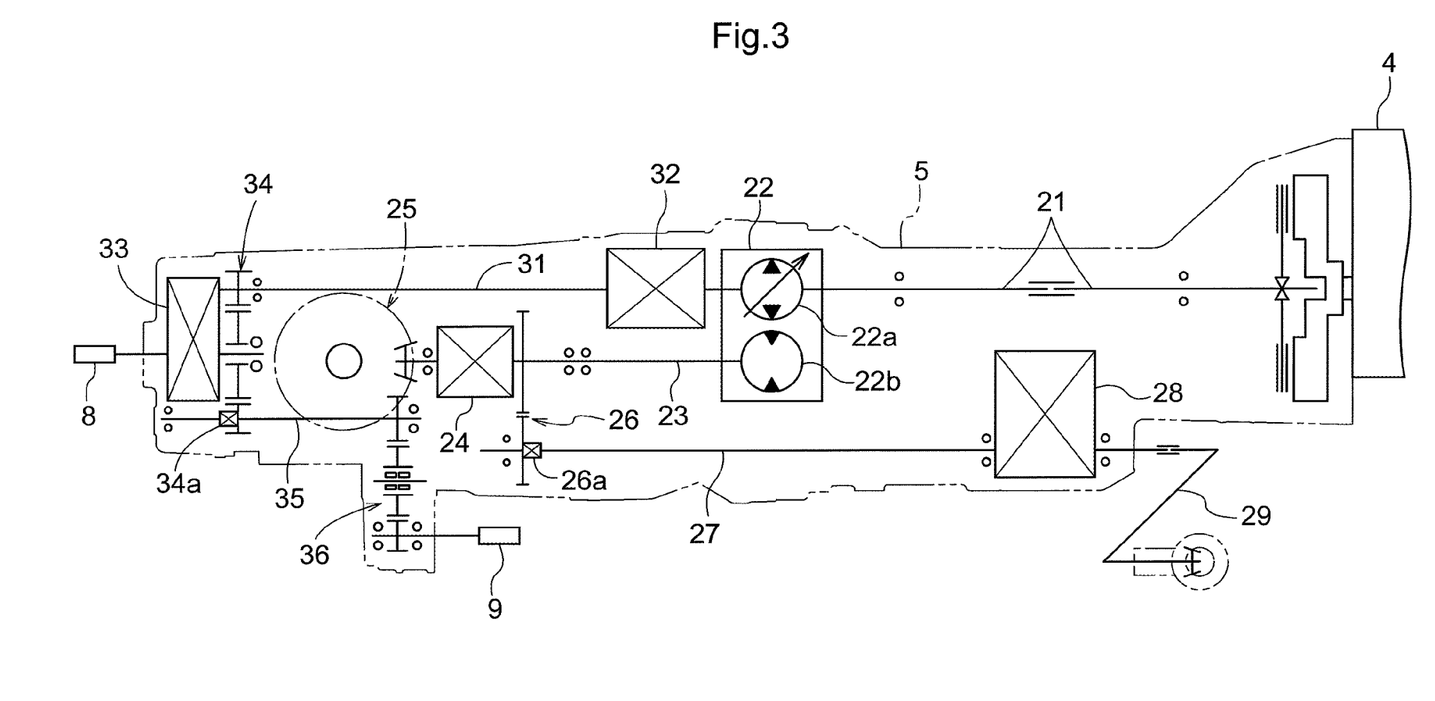
FIG. 3 is a side view illustrating a power transmission arrangement of a transmission case.

As shown in FIG. 3, the transmission case 5 includes: a main drive shaft 21 configured to receive the driving force from the engine 4; a hydrostatic-type continuously variable transmission device 22 (hydrostatic transmission or HST) configured to steplessly vary (speed-change) the driving force from the main drive shaft 21; a varied output shaft 23 configured to transmit the driving force after it is varied steplessly by the continuously variable transmission device 22; a gear shift mechanism 24 configured to vary the driving force of the varied output shaft 23; and a differential gear 25 for the rear wheels 2 configured to receive the driving force from the gear shift mechanism 24.

The continuously variable transmission device 22 includes: a variable displacement pump 22a capable of changing the amount of operating oil to be discharged; and a hydraulic motor 22b configured to be rotated by the operating oil supplied from the variable displacement pump 22a. The continuously variable transmission device 22 is configured to steplessly adjust the drive rate of the hydraulic motor 22b by changing an amount of operating oil supplied from the variable displacement pump 22a. The amount of operating oil supplied from the variable displacement pump 22a is controlled depending on an amount of depression of the accelerator pedal 17 in the driver section C.

The gear shift mechanism 24 includes: a plurality of gears capable of increasing/decreasing (accelerating/decelerating) the drive rate; and a shift gear capable of selectively meshing with one of a plurality of gears, whereby the driver can manually operate the shift gear to select a travel speed.

The transmission case 5 is provided with: an intermediate drive shaft 27 configured to receive the driving force of the varied output shaft 23 via an intermediate power transmission gear mechanism 26; a front-wheel accelerating device 28 capable of increasing the drive rate of the intermediate drive shaft 27; and a front-wheel drive shaft 29 configured to transmit the driving force from the front-wheel accelerating device 28 to the front wheels 1.

The intermediate power transmission gear mechanism 26 includes a front-wheel clutch section 26a capable of being manually operated to permit or block power transmission. Operating the front-wheel clutch section 26a to block power transmission sets the front wheels 1 to a non-driven state, whereas operating the front-wheel clutch section 26a to permit power transmission drives the front wheels 1. The front-wheel clutch section 26a is configured to be operated manually.

Figure 5:
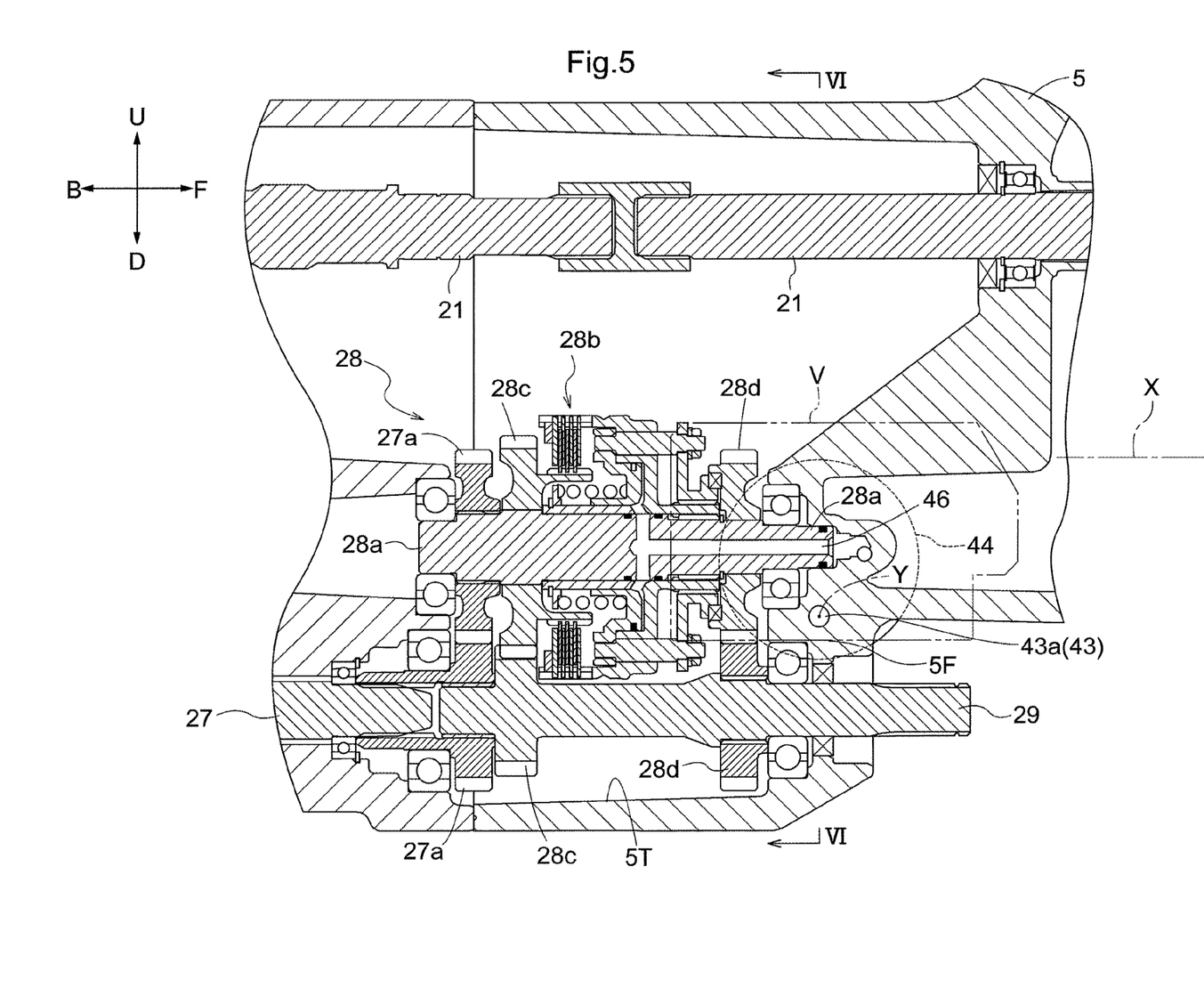
FIG. 5 is a view in vertical section showing a portion of the transmission case in the vicinity of a front-wheel accelerating device.

As shown in FIG. 5, the front-wheel accelerating device 28 includes: a clutch shaft 28a configured to be rotated under a driving force from the intermediate drive shaft 27; and a front-wheel accelerating clutch mechanism 28b of a multi-disc friction type (an example of the "multi-disc clutch mechanism") configured to transmit the driving force of the clutch shaft 28a to the front-wheel drive shaft 29 in the form of either a constant-rate (equal speed) driving force or an accelerating driving force.

The front-wheel accelerating device 28 is configured such that the clutch shaft 28a receives a driving force from the intermediate drive shaft 27 via a pair of intermediate gears 27a. When the front-wheel accelerating clutch mechanism 28b is supplied with no operating oil, the front-wheel accelerating device 28 transmits the driving force from the intermediate drive shaft 27 to a constant-rate drive gear 28d under an urging force by a spring, thereby transmitting a constant-rate driving force to the front-wheel drive shaft 29.

When the front-wheel accelerating clutch mechanism 28b is supplied with operating oil, on the other hand, the front-wheel accelerating device 28 transmits the driving force from the intermediate drive shaft 27 to an accelerating drive gear 28c, thereby transmitting an accelerating driving force to the front-wheel drive shaft 29.

The front-wheel accelerating clutch mechanism 28b is configured to be supplied with operating oil when the steering angle of the front wheels 1 is equal to or exceeds a set value. Thus, when the steering wheel 12 is not turned greatly (that is, the steering angle of the front wheels 1 is smaller than the set angle) or when the work machine is substantially traveling straight, the front-wheel accelerating device 28 keeps a constant-rate driving state, in which it transmits a constant-rate driving force via the constant-rate drive gear 28d to the front-wheel drive shaft 29, so that the front wheels 1 are driven at a circumferential speed equal to that of the rear wheels 2.

When the steering wheel 12 has been turned by an angle larger than the set angle (that is, the steering angle of the front wheels 1 is not smaller than the set angle), on the other hand, the front-wheel accelerating clutch mechanism 28b is supplied with operating oil, so that the front-wheel accelerating device 28 transmits an accelerating driving force to the front-wheel drive shaft 29 to increase the drive rate of the front wheels 1 over the circumferential speed of the rear wheels 2. This can reduce the turning radius of the machine body A.

With reference back to FIG. 3, the transmission case 5 includes: a work drive shaft 31 arranged coaxial with a portion of the main drive shaft 21 which extends through the continuously variable transmission device 22 in the front-back direction; the multi-disc friction type PTO clutch 32 configured to permit or block transmission of a driving force from the main drive shaft 21 to the work drive shaft 31, and a work transmission mechanism 33 configured to vary a driving force transmitted from the work drive shaft 31 to the rear PTO shaft 8.

The transmission case 5 further includes, at a lower portion thereof: a lower drive shaft 35 configured to receive the driving force from the work drive shaft 31 via a work power transmission gear 34 and a lower power transmission gear mechanism 36 configured to transmit the driving force from the lower drive shaft 35 to the mid PTO shaft 9.

The PTO clutch 32 is configured to bring a plurality of friction plates into contact with one another in response to supply of operating oil, to thereby transmit a driving force to the rear PTO shaft 8 and the mid PTO shaft 9. The work power transmission gear 34 includes a work clutch section 34a capable of being manually operated to permit or block power transmission. Operating the work clutch section 34a to block power transmission sets the mid PTO shaft 9 to a non-driven state, whereas operating the work clutch section 34a to permit power transmission drives the mid PTO shaft 9.

[Hydraulic Circuit]

Figure 4:
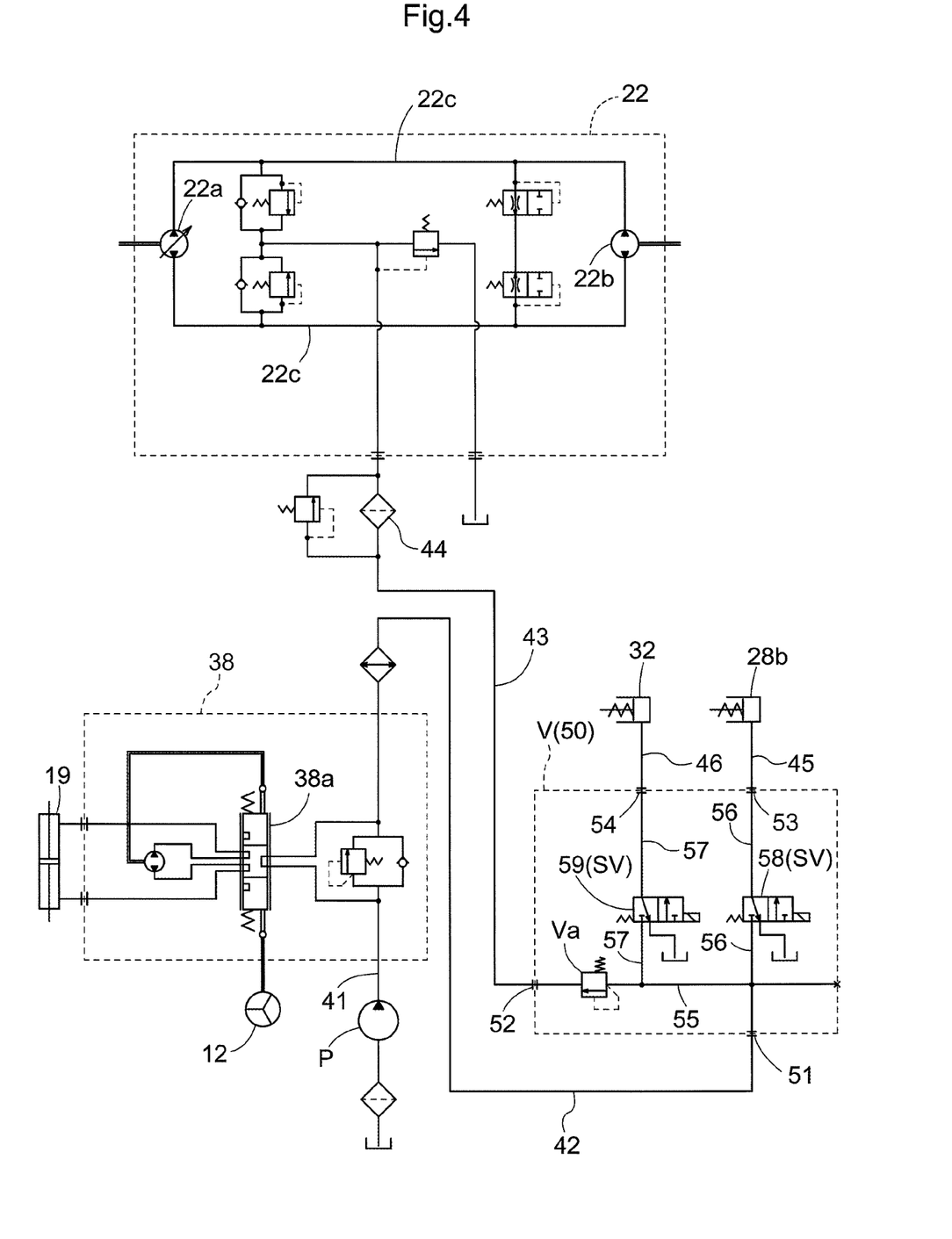
FIG. 4 is a hydraulic circuit diagram of the tractor.

As shown in FIG. 4, the tractor T includes an oil-passage structure configured to: supply operating oil from a hydraulic pump P through a first oil passage 41 to a hydraulic power steering unit 38; and supply operating oil from the power steering unit 38 through a second oil passage 42 to a valve unit V. Further, the oil-passage structure is configured to supply operating oil from the valve unit V through a third oil passage 43 (a specific example of the "supply passage") to a filter 44, and then the operating oil is supplied through the filter 44 to the continuously variable transmission device 22 as charge oil. Incidentally, the hydraulic pump P may be driven by any one of an electric motor and the engine 4.

The power steering unit 38 is configured to operate a steering valve 38a in response to operation of the steering wheel 12, whereby operating oil is supplied and discharged between the steering valve 38a and a double-acting steering cylinder 19. The steering cylinder 19 is provided on the machine body A and configured to control the front wheels 1.

The continuously variable transmission device 22 includes the variable displacement pump 22a and the hydraulic motor 22b as described above, and uses the operating oil supplied through the third oil passage 43 as charge oil to be supplied to a circuit 22c between the variable displacement pump 22a and the hydraulic motor 22b.

[Valve Unit for Hydraulic Circuit]

Figure 6:
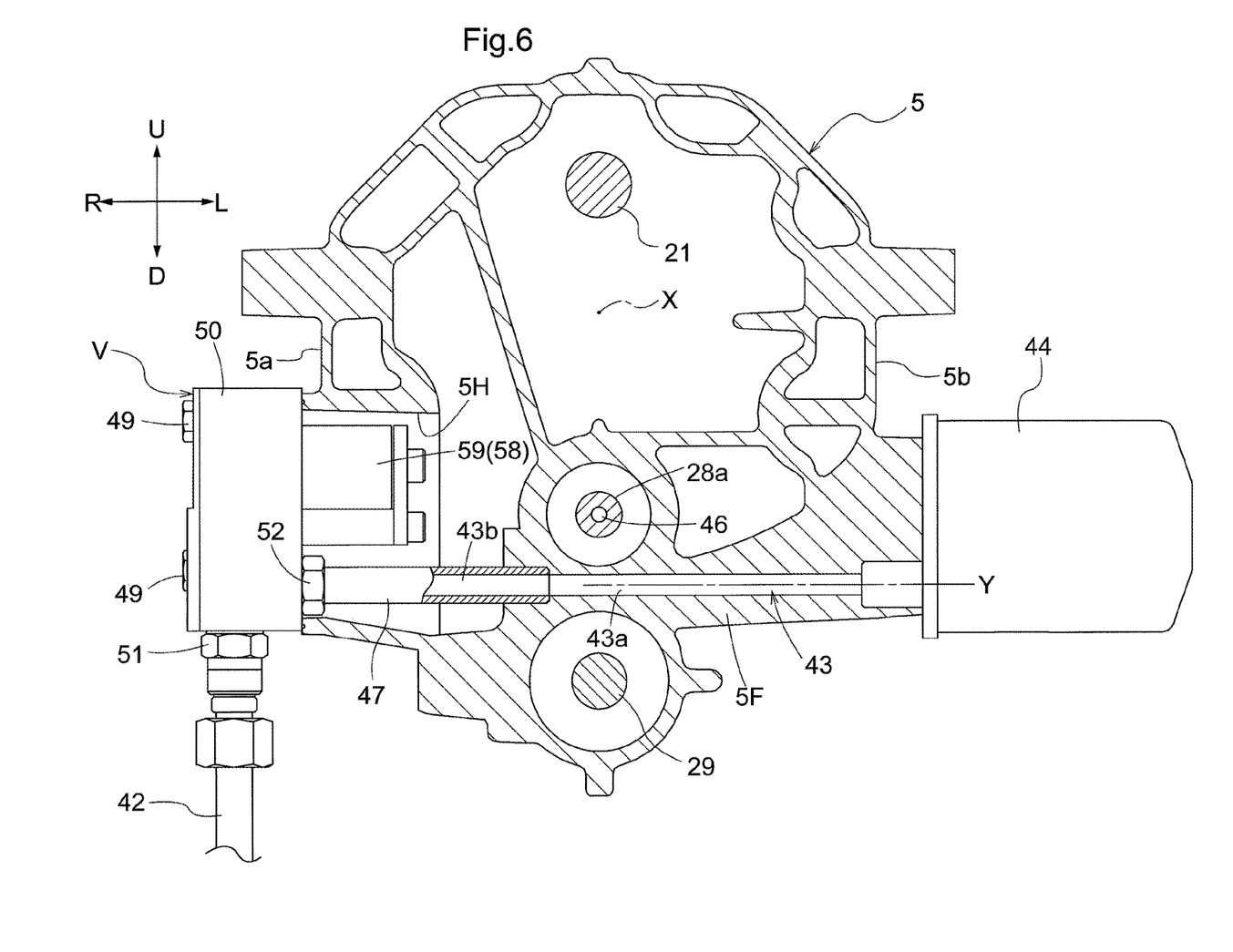
FIG. 6 is a view in section taken along VI-VI in FIG. 5.
Figure 7:
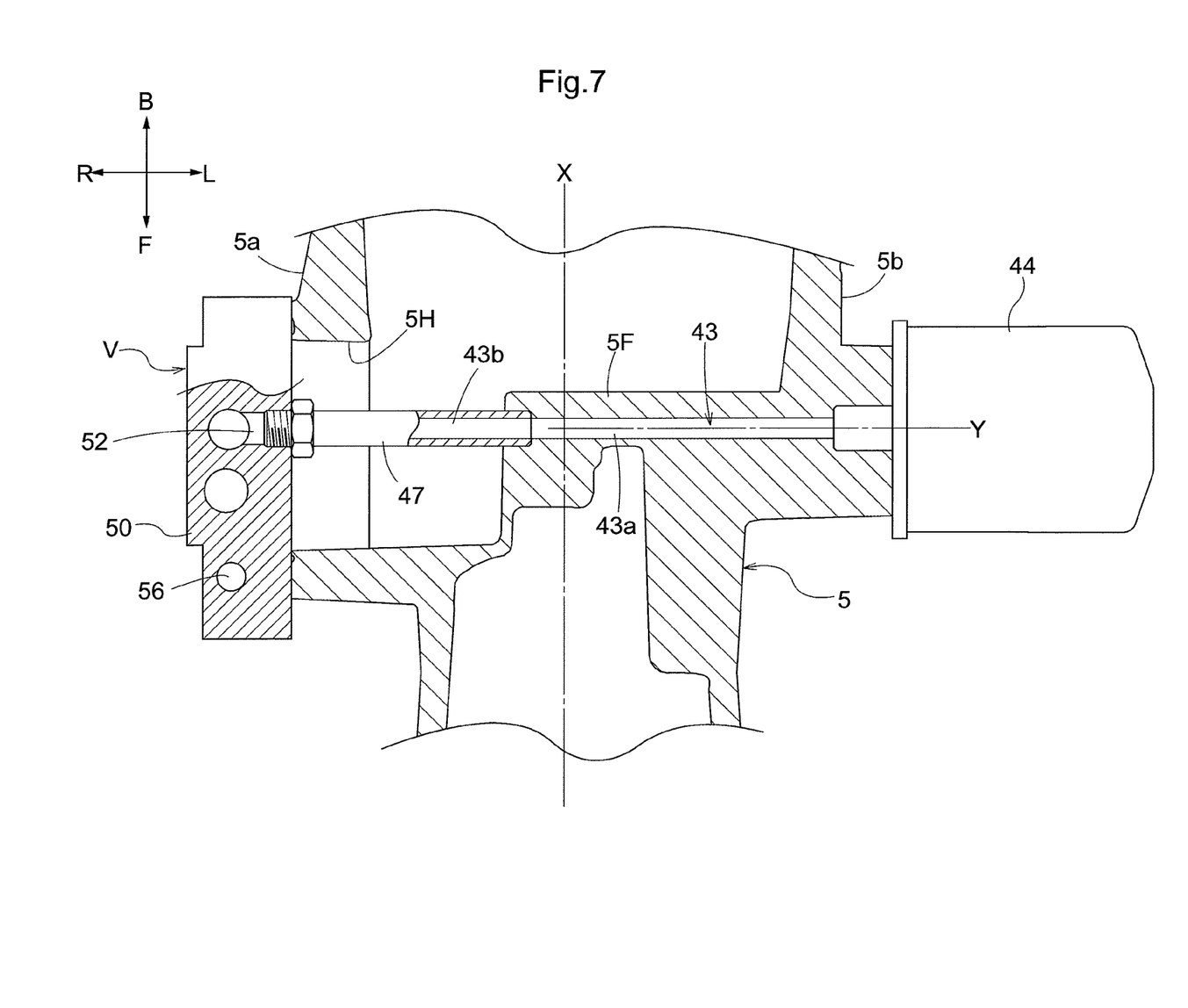
FIG. 7 is a view in section showing a portion of the transmission case in the vicinity of a third oil passage.

As shown in FIGS. 6 and 7, the transmission case 5 includes a side wall with an opening 5H. The valve unit V is attached to the transmission case 5 by a plurality of fixation bolts 49 at such a position as to cover the opening 5H. When the valve unit V is attached as such, a surface thereof exposed to the outside is referred to as an "outer surface", and an opposite surface to the external surface is referred to as a "reverse surface".

As shown in FIG. 4, the valve unit V includes a valve housing 50 having a pump port 51, a discharge port 52, a first control port 53 and a second control port 54. In particular, the discharge port 52 is formed in an inner surface of the valve housing 50.

The first oil passage 41 is connected to the pump port 51. A supply oil passage 55 is formed within the valve housing 50 to receive operating oil from the pump port 51. A pressure adjustment valve Va is provided within the valve housing 50 to adjust the pressure in the supply oil passage 55.

The pressure adjustment valve Va functions similarly to a relief valve. Specifically, the pressure adjustment valve Va is closed while the pressure of the supply oil passage 55 is smaller than a set value and is open while the pressure of the supply oil passage 55 is not smaller than the set value. This allows the supply oil passage 55 to keep the pressure within a set range. A portion of the supply oil passage 55 downstream of the pressure adjustment valve Va is connected to the discharge port 52. The third oil passage 43 is connected to the discharge port 52. The third oil passage 43 will be described later in further detail.

A first control oil passage 56 and a second control oil passage 57 are connected to the supply oil passage 55 at two respective positions thereof upstream of the pressure adjustment valve Va. The first control oil passage 56 is provided with a first control valve 58 halfway thereof in the form of a solenoid valve SV. The second control oil passage 57 is provided with a second control valve 59 halfway thereof in the form of a solenoid valve SV.

The first control port 53 is connected to a first clutch control oil passage 45. The first clutch control oil passage 45 serves to supply operating oil to the front-wheel accelerating clutch mechanism 28b of the front-wheel accelerating device 28. The second control port 54 is connected to a second clutch control oil passage 46. The second clutch control oil passage 46 serves to supply operating oil to the PTO clutch 32.

Though not shown, since the first control port 53 is present on an inner surface of the valve housing 50, the first clutch control oil passage 45 extends through the opening 5H into the space inside the transmission case 5.

The first control valve 58 and the second control valve 59 has respective electromagnetic solenoid sections thereof protruding backward from the back face of the valve housing 50. Each of the electromagnetic solenoid portions is present at such a position as to enter the opening 5H of the transmission case 5.

[Oil Passages in Transmission Case]

As shown in FIGS. 5 to 7, the transmission case 5 extends in the front-back direction of the machine body A, and includes a right wall portion 5a and a left wall portion 5b at positions opposite to each other. The valve unit V (an example of the "first hydraulic unit") is attached to an outer surface of the right wall portion 5a. The filter 44 (an example of the "second hydraulic unit") is attached to an outer surface of the left wall portion 5b.

As described above, the transmission case 5 houses the continuously variable transmission device 22, and the filter 44 is configured to filter operating oil supplied through the third oil passage 43. The transmission case 5 includes a bottom portion which serves as an operating oil tank 5T configured to store operating oil. In the instant embodiment, the transmission case 5 is configured to store lubricating oil at the bottom portion; and the tractor T uses the lubricating oil at the bottom portion of the transmission case 5 as operating oil.

The valve unit V and the filter 44 are aligned to be overlapped with each other as viewed in a direction orthogonal to a case axis X extending in the front-back direction of the transmission case 5 (specifically, in a side view of the machine body A). The third oil passage 43 as an example of the supply passage extends inside the transmission case 5 in a straight line coaxial with a passage axis Y that is orthogonal to the case axis X, so that operating oil may be supplied from the valve unit V to the filter 44 over the shortest distance. The passage axis Y extends horizontal as viewed in the front-back direction of the machine body A.

As shown in FIGS. 6 and 7, the valve housing 50 of the valve unit V has a discharge port 52 that is open in a direction from the opening 5H of the transmission case 5 toward the internal space of the transmission case 5. The transmission case 5 includes an internal member 5F in the form of a vertical wall that is formed integral with an inner surface of the right wall portion 5a and an inner surface of the left wall portion 5b, at a position overlapped with the passage axis Y.

The third oil passage 43 includes: a hole-shaped oil passage 43a formed by cutting (for example, drilling) the internal member 5F; and an in-pipe oil passage 43b formed in a pipe-shaped member 47 to guide operating oil from the discharge port 52 of the valve housing 50 to the hole-shaped oil passage 43a.

In particular, the third oil passage 43 is arranged such that one end of the hole-shaped oil passage 43a proximate to the valve unit V has an inner diameter that is sufficiently increased to receive a first end of the pipe-shaped member 47 as it is inserted. The pipe-shaped member 47 has a second end fitted in the discharge port 52 of the valve unit V.

With the above arrangement, fixing the valve unit V to the right wall portion 5a of the transmission case 5 by the fixation bolts 49, with the second end of the pipe-shaped member 47 being inserted in advance in the discharge port 52 of the valve unit V, allows the first end of the pipe-shaped member 47 to be inserted through the end of the hole-shaped oil passage 43a. This allows the in-pipe oil passage 43b in the pipe-shaped member 47 and the hole-shaped oil passage 43a to be communicated with each other, thereby allowing operating oil to be supplied from the valve unit V to the filter 44.

As shown in FIGS. 5 and 6, the internal member 5F includes a support section present over the hole-shaped oil passage 43a for supporting an end of the clutch shaft 28a of the front-wheel accelerating device 28; and has an opening under the hole-shaped oil passage 43a through which opening the front-wheel drive shaft 29 is present.

As shown in FIGS. 6 and 7, the valve housing 50 of the valve unit V is attached to the outer surface of the right wall portion 5a of the transmission case 5 without a gap to the outer surface. Similarly thereto, the filter 44 is attached to the outer surface of the left wall portion 5b of the transmission case 5 without a gap to the outer surface. Such attachment with no gap not only allows stable attachment, but also can prevent leakage of e.g. part of operating oil supplied to the third oil passage 43 and operating oil inside the transmission case 5.

[Operational Effects of Embodiment]

The arrangement described above allows operating oil in the operating oil tank 5T to be supplied from the hydraulic pump P to the power steering unit 38, the valve unit V and the continuously variable transmission device 22 in this order. In particular, since a portion of the third oil passage 43 for supplying operating oil from the valve housing 50 of the valve unit V to the filter 44 is formed of the hole-shaped oil passage 43a that is formed by cutting the internal member 5F inside the transmission case 5, a structure thereof can be made simpler, compared with an arrangement including a conduit extending through the internal space of a transmission case 5 over its entire width, whereby the third oil passage 43 can be formed with a smaller number of parts.

In the tractor T, operating oil is supplied from the discharge port 52 of the valve unit V to the filter 44 along the third oil passage 43 acting as the supply passage in a straight line over the shortest distance. This prevents the supply amount from being decreased due to a pressure loss on the third oil passage 43.

In the third oil passage 43, the pipe-shaped member 47 can be used to form the in-pipe oil passage 43b for supplying operating oil from the valve housing 50 to the hole-shaped oil passage 43a. Thus, even when a center of the discharge port 52 of the valve housing 50 is slightly offset from the passage axis Y, for example, slightly bending the pipe-shaped member 47 allows operating oil from the in-pipe oil passage 43b to be supplied to the hole-shaped oil passage 43a, whereby assembly of an oil passage system can be facilitated.

Since the internal member 5F is provided as a component for supporting an end of the clutch shaft 28a of the front-wheel accelerating device 28, there is no need to modify the transmission case 5 to form the third oil passage 43.

Suppose a tractor T without a continuously variable transmission device 22, for example, such production may still involve use of the above-described transmission case 5 from the viewpoint of sharing parts of the machine body A with another tractor having another specification. Producing such a tractor T, however, does not involve drilling the internal member 5F of the transmission case 5, since operating oil does not need to be supplied to the filter 44.

[Other Embodiments]

The present invention may be embodied in various ways other than the foregoing embodiment. In other embodiments to be described below, identical reference numerals/marks are appended to any elements that are identical in function to those in the foregoing embodiment.

(a) In the foregoing embodiment, the first hydraulic unit includes the valve unit V having a pressure adjustment valve Va; and two control valves each in the form of a solenoid valve SV (i.e. the first control valve 58 and the second control valve 59). Instead thereof, the first hydraulic unit may be a unit including a pressure adjustment valve Va only, or may be a unit including a flow dividing valve configured to divide the flow of operating oil into a plurality of oil passages.

(b) In the foregoing embodiment, the second hydraulic unit includes a filter 44. Instead thereof, the second hydraulic unit may be a unit including a relief valve configured to adjust the pressure of operating oil and/or a flow rate control valve configured to control the rate of the flow of operating oil.

(c) The hole-shaped oil passage 43a and the in-pipe oil passage 43b of the third oil passage 43 (supply passage) in the foregoing embodiment may be arranged vice versa. Specifically, the operating oil from the discharge port 52 of the valve unit V (the first hydraulic unit) may be supplied to the hole-shaped oil passage 43a; and the operating oil from the hole-shaped oil passage 43a to the in-pipe oil passage 43b and then to the filter 44 (the second hydraulic unit).

(d) All of the first hydraulic unit and the second hydraulic unit is not necessarily present on a side wall portion of the transmission case 5. Specifically, the first hydraulic unit and the second hydraulic unit may be positioned such that the passage axis Y is not horizontal as viewed in the front-back direction of the machine body A.

(e) An entire length of the third oil passage 43, acting as the supply passage, may be in the form of the hole-shaped oil passage 43a by extending the hole-shaped oil passage 43a straight along the passage axis Y through an internal member 5F between opposite wall portions of the transmission case 5.

(f) An entire length of the third oil passage 43, acting as the supply passage, may be in the form of the in-pipe oil passage 43b by extending the pipe-shaped member 47 straight along the passage axis Y between opposite wall portions of the transmission case 5.

(g) The supply passage does not necessarily include a combination of a single hole-shaped oil passage 43a and a single in-pipe oil passage 43b. Instead thereof, the supply passage may include a combination of any number of hole-shaped oil passages 43a in the internal member 5F, and any number of in-pipe oil passages 43b in the same number of pipe-shaped members 47, each extending straight along the passage axis Y.

Specifically, the supply passage in the embodiment (g) may include: a combination of a plurality of hole-shaped oil passages 43a and a plurality of in-pipe oil passages 43b; a combination of a single hole-shaped oil passage 43a and a plurality of in-pipe oil passages 43b; and a combination of a plurality of hole-shaped oil passages 43a and a single in-pipe oil passage 43b.

(h) At least one of the first hydraulic unit (e.g. the valve unit V) and the second hydraulic unit (e.g. the filter 44) may be attached to the transmission case 5 slightly afloat from the outer surface of the transmission case 5 associated therewith.

What is claimed is:

1. A work machine comprising:
a transmission case provided on a machine body and extending in a front-back direction of the machine body, the transmission case having mutually opposite wall portions;
a first hydraulic unit provided on one of the wall portions, and a second hydraulic unit provided on the other of the wall portions; and
a supply passage configured to supply operating oil from the first hydraulic unit to the second hydraulic unit,
wherein the first hydraulic unit and the second hydraulic unit are aligned to be overlapped with each other as viewed in a direction orthogonal to a case axis extending along a front-back direction of the transmission case,
wherein the supply passage has a first end and a second end,
wherein the first end of the supply passage is directly connected to the first hydraulic unit,
wherein the second end of the supply passage is directly connected to the second hydraulic unit, and wherein the supply passage extends inside the transmission case entirely in a straight line orthogonal to the case axis.

2. The work machine according to claim 1, wherein the transmission case includes an internal member that is formed integral with respective inner surfaces of the wall portions, and wherein at least part of the supply passage is formed into a hole-shaped oil passage by cutting the internal member.

3. The work machine according to claim 2, wherein the supply passage includes the hole-shaped oil passage, and an in-pipe oil passage in form of a pipe-shaped member.

4. The work machine according to claim 3, wherein the hole-shaped oil passage extends from either one of the one and the other of the wall portions, and wherein the pipe-shaped member extends from the other one of the one and the other of the wall portions to an end of the hole-shaped oil passage.

5. A work machine comprising:

a transmission case provided on a machine body and extending in a front-back direction of the machine body, the transmission case having mutually opposite wall portions;

a first hydraulic unit provided on one of the wall portions and a second hydraulic unit provided on the other of the wall portions; and a supply passage configured to supply operating oil from the first hydraulic unit to the second hydraulic unit, wherein the first hydraulic unit and the second hydraulic unit are aligned to be overlapped with each other as viewed in a direction orthogonal to a case axis extending along a front-back direction of the transmission case, wherein the supply passage extends inside the transmission case in a straight line orthogonal to the case axis, wherein the transmission case houses a hydrostatic-type continuously variable transmission device, wherein a bottom portion of the transmission case serves as an operating oil tank configured to store the operating oil, wherein the first hydraulic unit includes a valve unit configured to control the operating oil from the operating oil tank, and wherein the second hydraulic unit includes a filter configured to filter the operating oil to be supplied to the continuously variable transmission device.

6. The work machine according to claim 1, wherein a support section is provided above the supply passage for supporting a clutch shaft of a multi-disc clutch mechanism that is configured to hydraulically permit or block transmission of a driving force.

7. The work machine according to claim 1, wherein a front-wheel drive shaft is provided below the supply passage, the front-wheel drive shaft being configured to transmit a driving force from the transmission case to a front wheel.

8. The work machine according to claim 1, wherein at least one of the first hydraulic unit and the second hydraulic unit is attached to an outer surface of the wall portion associated therewith without a gap to the outer surface.

* * * * *